Jan. 26, 1971         P. M. HAFER         3,559,148
              BUSBAR COUPLER SYSTEM
Filed June 11, 1969                6 Sheets-Sheet 4

INVENTOR.
Paul M. Hafer
BY
WOOD, HERRON & EVANS
ATTORNEYS

United States Patent Office 3,559,148
Patented Jan. 26, 1971

3,559,148
BUSBAR COUPLER SYSTEM
Paul M. Hafer, Florence, Ky., assignor, by mesne assignments, to Arrow-Hart, Inc., Hartford, Conn., a corporation of Connecticut
Continuation-in-part of application Ser. No. 695,982, Jan. 5, 1968. This application June 11, 1969, Ser. No. 834,223
Int. Cl. H01r 13/60
U.S. Cl. 339—22
19 Claims

ABSTRACT OF THE DISCLOSURE

A novel busbar coupler in combination with a busbar dust that permits a series of those combinations to be easily and simply joined electrically into an extended length busway run in an end-to-end relation and that permits easy and simple replacement of a single busbar duct in that run without removing other abutting sections from the end-to-end relationship. In combination with each busbar duct there is provided a busbar coupler which is axially movable relative to the duct's housing between a first position whereat the coupler is recessed within the housing to a point which permits transverse movement of a successive busbar duct relative to this duct when both ducts are positioned in end-to-end relation for establishing an electrical joint therebetween and a second position whereat the coupler is extended from the housing to a point which permits adjacent busbar ends of each duct to be clamped together in pairs by the coupler to establish the electrical joint. The coupler is comprised of a force frame for permitting pressure to be exerted on the pairs of adjacent busbar ends to create the pressure type electrical joint between successive busbar ducts and pressure means adjustably associated with the force frame for varying the pressure exerted to permit selective connecting and disconnecting of the electrical joint.

This application is a continuation-in-part of my presently pending U.S. application, U.S. Ser. No. 695,982, filed Jan. 5, 1968, and now abandoned.

This invention relates to busbar systems and, more particularly, relates to a method and apparatus for coupling successive busway sections together into an extended length busbar system.

Generally speaking, electric power distribution systems of the busbar type are used in industrial and commercial buildings to transfer electric power from a substation or transformer bank to a power consuming area. Such power distribution systems are generally made up of a plurality of busway sections of fixed or variable lengths, the successive sections being connected or interlocked together in end-to-end relation to provide electrical continuity between the power source and the power consuming area. The effectiveness of such a busbar power distribution system is controlled, to a great extent, by the adequacy of the electrical joints between the busbars of successive busway sections. Busway sections are generally manufactured and distributed in prefabricated form so that a number of such electrical joints are required during installation of an extended length busbar run. Thus, if a busway section, that is, a busbar duct and a busbar coupler, is to perform adequately under service conditions the coupler system that creates the electrical joints between correspond busbars of successive busway sections must be constructed to give minimum chance for effecting improper electrical joints.

It is desirable that the individual prefabricated busway sections be compact and that the busbar coupler system be simple to operate so that corresponding busbars of successive busway sections can be easily joined initially in end-to-end relation to create the extended length busway run. Also, it is desirable that an individual busway section intermediate the ends of an extended length busbar run be easily replaced when replacement is required without removing the busway sections on either side of the replacement section from the extended length busbar run. Such ease of initial installation and ease of replacement of busway sections in their end-to-end or abutting relationship is desired because most installations are suspended from a wall or ceiling.

One type of busbar coupler system well known in the art for interconnecting successive busbar ducts in an extended length busbar run involves the through-bolt type structure for creating an electrical joint. In a through-bolt joint the ends of corresponding busbars in successive busway sections may have overlapped slots in each bar's end which are aligned with one another, and the busbars then pressure clamped together by a single bolt passed through all the slots and held in place with *lock nuts at each end*. Such a joint is relatively time consuming and laborious to prepare, and requires the use of discrete parts, such as the through-bolt and *lock nuts*, which are separate (and easily misplaced) from the busbar ducts. This type of busbar joint or coupler system, as well as other types of joints known in the art, cause problems when replacing a single busway section in the extended length busbar run because two entire through-bolt connector assemblies must be removed before a single section of busbar duct can be removed from the extended length run for replacement. Further, in other known busbar joint or coupler system constructions the housing of the busway section may comprise some part of the joint, thereby placing stress and strain on the housing itself.

An important objective of this invention has been to provide a novel busbar coupler system, that is, method and apparatus, in which the electrical connection or joint between successive busbar ducts in an extended length busbar run, during initial installation of that run, can be simply and easily accomplished through axially telescoping movement of a busbar coupler relative to the duct's housing between a recessed position within one of the ducts where it cannot be contacted by transverse movement of an adjacent busway section in the run and a clamping position with the adjacent corresponding busbar ends from a successive busway section for creating an electrical joint therebetween. This concept also permits easy replacement of a single busway section within an extended length busbar run without requiring movement of the adjacent busway sections positioned in end-to-end relation with that which must be replaced because the busway section to be replaced can be easily dropped out of the extended length run after the electrical joint has been disconnected and the busbar couplers axially telescoped into their respective busbar duct housings.

Another objective of this invention has been to provide a novel busbar coupler system where the housing of the busbar duct does not serve as an operating part of the joint forming or bar coupling means, thereby permitting the joint to "float" relative to the housing so the housing is not affected by distortions that may occur in the busbars due to excessive heat and the like.

A further objective of this invention has been to provide a particular busbar coupler system embodiment where the busbars within a single busway section are separated into at least two groups, and each group is joined separate and apart from the other at their respective electrical joints, as well as apart from the housing, thereby providing at least two "floating joints" within the housing so that distortions occurring in one busbar group are isolated from the other busbar group as well as the housing.

The objectives of this invention have been attained by providing a novel busbar coupler in combination with a busbar duct that permits a series of those combinations to be easily and simply joined electrically into an extended length busbar run in an end-to-end relation and that permits easy and simple replacement of a single busbar duct in that run without removing other abutting sections from the end-to-end relationship. In combination with each busbar duct there is provided a busbar coupler which is axially movable relative to the duct's housing between a first position whereat the coupler is recessed within the housing to a point which permits transverse movement of a successive busbar duct relative to this duct when both ducts are positioned in end-to-end relation for establishing an electrical joint therebetween and a second position whereat the coupler is extended from the housing to a point which permits adjacent corresponding busbar ends of each duct to be clamped together in pairs by the coupler to establish the electrical joint. The coupler is comprised of a force frame for permitting pressure to be exerted on the pairs of adjacent corresponding busbar ends to create the pressure type electrical joint between successive busbar ducts and pressure means adjustably associated with the force frame for varying the pressure exerted to permit selective connecting and disconnecting of the electrical joint.

Other objectives and advantages of the invention will be more apparent from the following detailed description taken in conjunction with the drawings in which.

GENERAL STRUCTURE AND METHOD OF OPERATION

As illustrated in FIGS. 1–10, this invention contemplates a separate busbar coupler 10 axially or telescopically receivable within a busbar duct which serves the function of clamping together into a pressure type electrical joint the corresponding busbar ends in two successive busbar ducts, that is, the first busbar duct 11 and a second busbar duct 12, to establish electrical continuity when installing an extended length busbar run having a series of such ducts 11, 12 in end-to-end relation between an electric power source and a power consuming area. Each busway section is comprised of a busbar duct 11 and a busbar coupler 10 associated with one end of that duct. In an extended length busbar run the end of a first duct 11 that carries a coupler 10 is always mated with that end of a successive or second duct 12 without a coupler.

Each busbar duct 11, 12 illustrated in FIGS. 1–10 include two separate groups 17, 18 of busbars 19 positioned within a housing 16. The housing 16 has at least one elongated slot 20 in each of its side walls 21. When the housings 16 of successive busway sections are mated in end-to-end relation, the corresponding busbars 19 are interleaved or overlapped into pairs 67 for creating electrical joints between the corresponding busbars, see FIG. 7. The busbar coupler 10 includes two force frames 22, 23 disposed within a support frame 24, a coupler being positioned at one end of each busbar duct 11, 12. Each force frame 22, 23 carries a group of insulator plates 25 adapted to be positioned between interleaved end pairs 67 of corresponding busbars 19 to insulate the busbar pairs one from the other to permit formation of pressure type electrical joints between pairs, see FIGS. 2 and 4. Each force frame 22, 23 is also provided with pressure means in the form of at least one pressure plate or disc spring washer 26 rotatably mounted to a pressure screw or positioning shaft 27, the positioning shaft being threadedly engaged with the outer end 28 of the force frame. Each positioning shaft 27 extends through and protrudes substantially beyond, but is not threadedly engaged with, the guide plate 29 adjacent the outer end 28 of each force frame 22, 23. A hex head 30 is mounted to the shaft's free end 31 for clamping adjustment purposes, i.e., for selectively connecting and disconnecting the busbar end pairs in a pressure type electrical joint. Thus, each busway section includes a busbar coupler 10 and a busbar duct 11.

Figure 6:
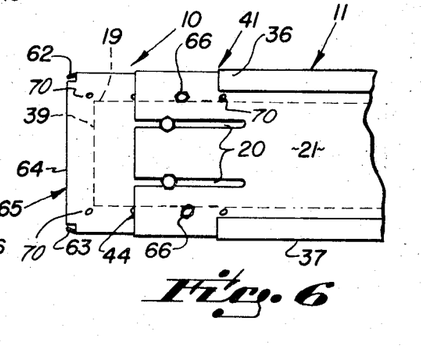
FIG. 6 is a side view showing the busbar coupler position as illustrated in FIG. 5.
Figure 7:
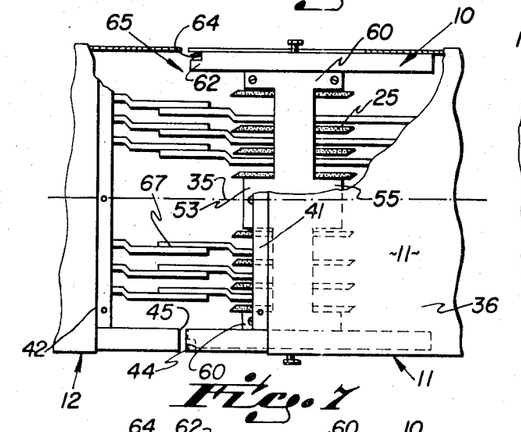
FIG. 7 is a view similar to FIG. 5 illustrating the busbar coupler for the first busbar duct fully recessed to a first position within the first busbar duct and showing the busbar ends of a second busbar duct adjacent to and interleaved with the corresponding busbar ends of the first busbar duct, this first position permitting transverse movement of the second busbar duct relative to the first busbar duct when both ducts are positioned as shown in an end-to-end relationship for establishing an electrical joint therebetween.
Figure 8:
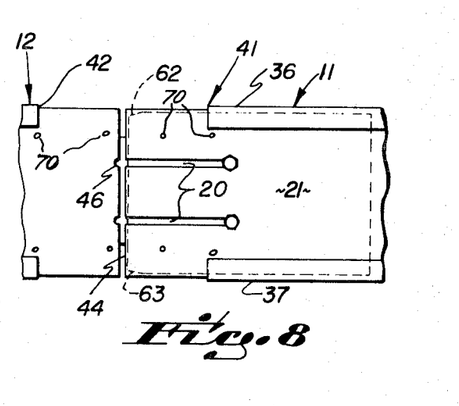
FIG. 8 is a side view showing the first busbar duct, the busbar coupler for the first busbar duct, and the second busbar duct as illustrated in FIG. 7.

In operation, and to effect easy installation of the busway sections, the busbar coupler 10 is first recessed within the first busbar duct 11 by moving the coupler axially, i.e., telescoping the coupler, in the forward direction relative to the busbar duct, see FIGS. 6 and 8. The coupler 10 is recessed to a first position within the housing 16 to a point which permits transverse movement relative to the axis of busbar duct 11 in a plane parallel with the planes of the busbars by a successive busbar duct 12 when both ducts 11, 12 are positioned in end-to-end relation for establishing an electrical joint therebetween as illustrated in FIGS. 7 and 8. The successive or second busbar duct 12 is mated with the first busbar duct 11 so that the ends of corresponding busbars 19 are interleaved or overlapped into end pairs 67, see FIG. 7. The busbar coupler 10 is then axially moved in the reverse direction toward the second busbar duct 12 until the insulator plates 25 are positioned between the interleaved busbar ends. That is, the coupler 10 is extended to a second position from the first duct's housing, after the busbar ends of a successive section 12 have been interleaved into pairs 67, to a point which permits the corresponding busbar ends of each section to be clamped together into pairs by the coupler 10 to establish the electrical joint between the two successive busway sections. Each positioning shaft 27 and hex head 30 extend outwardly beyond the housing's sides 21 at all times, thus, relative axial movement between the coupler 10 and the duct 11 is permitted by means of the slots 20 in the sides 21 of the housing 16.

Figure 9:
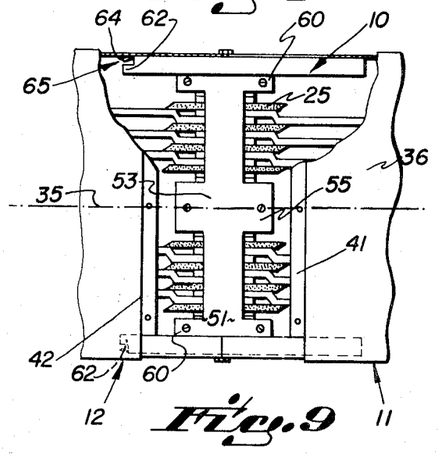
FIG. 9 is a view similar to FIG. 7 illustrating the busbar coupler in a second or clamping position with the second busbar duct where the coupler is extended from the first duct's housing to a point which permits the adjacent corresponding busbar ends of the second duct and the first duct to be clamped together in pairs by the coupler to establish the pressure type electrical joint.
Figure 10:
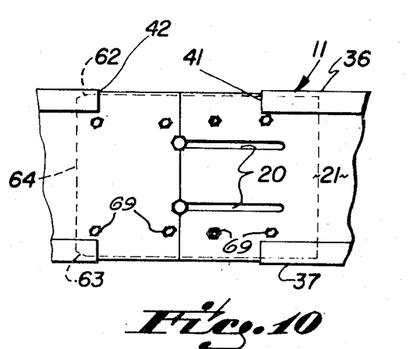
FIG. 10 is a side view showing the joint clamping position as illustrated in FIG. 9.

The disc spring washers 26 of each force frame 22, 23 are then tightened against the outermost insulator plate 25 in that force frame, thereby clamping each group 17, 18 of overlapped busbar ends and the respective insulator plates together to form two separate electrical joints, see FIGS. 9 and 10. Thus, the force frames 22, 23 function to permit pressure to be exerted on the pairs 67 of adjacent busbar ends to create the electrical joint between busway sections and the pressure means in the form of washers 26 and positioning shafts 27 adjustably associated with the force frames function to permit the pressure to be varied when creating the pressure type electrical joint and, thereby, permit selective connection and disconnection of the corresponding busbar end pairs that form the electrical joint.

STRUCTURE

Figure 1:
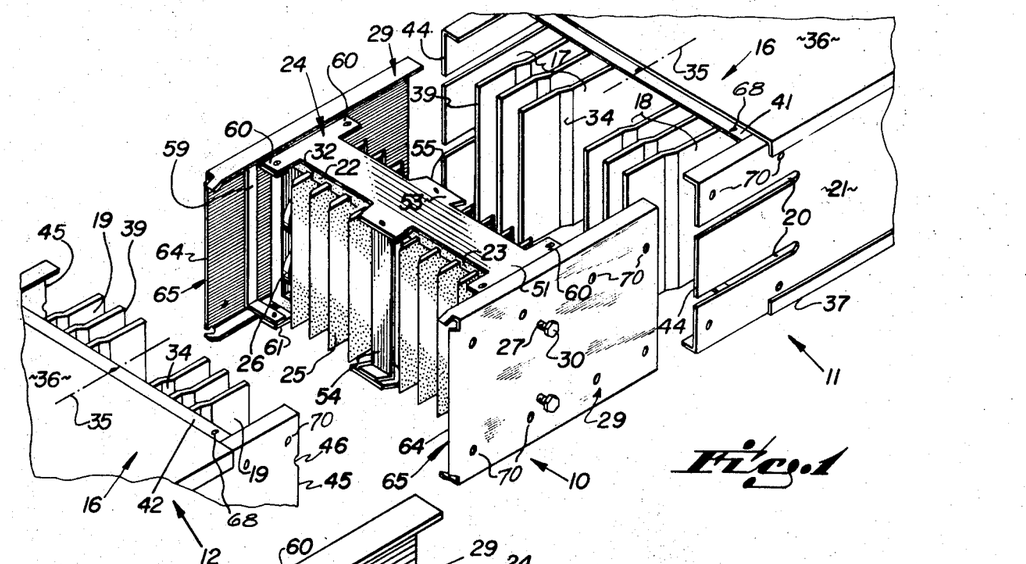
FIG. 1 is a perspective view illustrating a busbar coupler for a first busbar duct intermediate the leading end and the trailing end respectively, of the first duct and a second busbar duct.

The structure of the busbar coupler 10 and the busbar duct 11 is particularly illustrated in FIGS. 1-4. FIG. 1 illustrates the busbar duct 11 with two groups 17, 18 of busbars 19 positioned within the housing 16, each group comprising three busbars. Although each group has been illustrated as comprised of three busbars, it will be understood that any desired number of busbars, for example, even up to ten or more, may be included in each group. Each bar is illustrated as having an offset 34 toward each end so as the corresponding busbar ends of successive busbar ducts 11, 12 are interleaved when the ducts are positioned in end-to-end relation for establishing an electrical joint therebetween (see FIGS. 7-10), the axes 35, 35 of the successive ducts will coincide. Each housing 16 includes a top 36, a bottom 37 and two side walls 21. The top 36 and bottom 37 of the housing 16 do not completely cover the busbars 19, that is, they stop substantially short of the ends 39 of the busbars at both their leading 41 and trailing 42 ends. However, both the side walls 21 of the housing 16 extend almost to the ends 39, of the busbars 19, see FIG. 6. That is, both the leading 44 and trailing 45 ends of the sides 21 extend almost to the ends 39 of the busbars 19, but the top 36 and bottom 37 stop substantially short of the busbar ends at their leading 41 and trailing 42 ends. This housing configuration permits the ends 39 of the busbars 19 to overlap where successive ducts 11, 12 are mated in end-to-end relation, i.e., where the housings abut end-to-end, for establishing a pressure type electrical joint between corresponding busbar ends of each duct.

Each of the two side walls 21 is provided with two longitudinal slots 20, one above the other, and both commencing at the leading end 44 of the side walls. The slots 20 in the side walls 21 extend inwardly a substantial distance and preferably extend just past the ends of the housing's top 36 and bottom 37. However, the trailing ends 45 of the sides 21 do not have slots but are provided with centering indentations 46 only.

Figure 4:
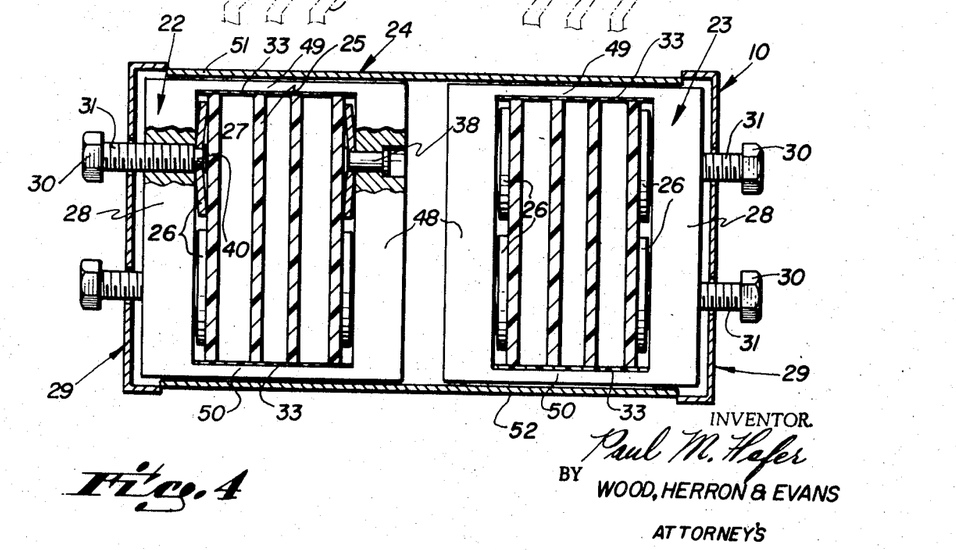
FIG. 4 is a cross-sectional view taken along lines 4—4 of FIG. 3.
Figure 5:
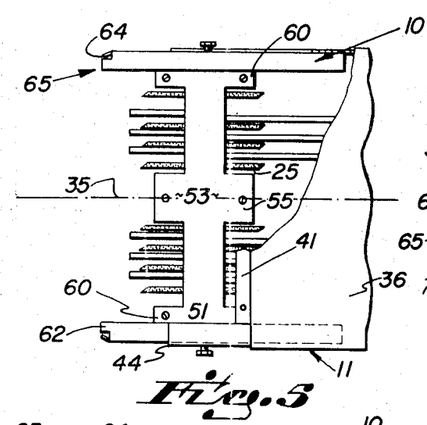
FIG. 5 is a partially broken away, top view of the busbar coupler partially recessed or telescoped into a first busbar duct.

The busbar coupler 10 comprises two rectangularly shaped force frames 22, 23 positioned end-to-end within the support frame 24 so that the force frames can move independent one of the other within the support frame, see FIG. 4. That is, the support frame 24 is of a major length that is more than the sum of the major lengths of the force frames 22, 23, thereby permitting the force frames to "float" or move end-to-end to a limited extent within the support frame. The force frames 22, 23 permit pressure to be exerted on the interleaved pairs of corresponding busbar ends to create the electrical joint between two successive busway sections. Each force frame 22, 23 is provided with spacer or insulator plates 25 that are made of an insulating material. The spacer plates 25 are dimensioned to permit side-to-side movement, that is, to move transversely of the busbar duct axes 35, 35 within each force frame 22, 23 and are provided with beveled leading and trailing edges for aiding in centering the plates between interleaved end pairs of busbars. Notches 32 are provided at the top and bottom of the spacer plates 25 to aid in retaining them within their respective force frames 22, 23. Insulator strips 33 are secured to the inner faces of the force frame's top 49 and bottom 50 to provide complete electrical insulation for the busbars 19 from the force frames 22, 23.

The inner end 48 of each force frame 22, 23 is provided with two pressure plates in the form of two disc spring washers 26 that are permanently and rotatably mounted as at 38 to the force frames 22, 23 see FIG. 4. The outer end 28 of each force frame 22, 23 is also provided with two pressure plates in the form of two disc spring washers 26, and these washers are rotatably mounted as at 40 to a plate positioner or pressure screw in the form of shafts 27. All shafts 27 are threadably engaged with their respective outer ends 28 of the force frames 22, 23. Although two washers 26 and two shafts 27 have been illustrated with the outer end 28 of each force frame 22, 23, it will be understood that the number of washers 26 and shafts 27 used will be primarily dependent on the size busbars to be joined. Each plate positioner or positioning shaft 27 is preferably in the form of a threaded bolt with a hex head 30, the bolt shafts being long enough to extend beyond the guide plates 29 of the support frame 24 and to extend beyond the sides 21 of the housing 16 when the coupler 10 is assembled within the busbar duct's housing 16. Each pressure screw or positioning shaft 27, therefore, is always threadedly engaged with the outer end 28 of a force frame 22, 23 but it is never threadedly engaged with the guide plates 29 or with the housing's sides 21. Thus, pressure means in the form of spring washers 26 and positioning shaft 27 is adjustably associated with the force frames 22, 23 for varying the pressure exerted on the interleaved busbar end pairs to permit selective connecting and disconnecting of the electrical joint.

Figure 2:
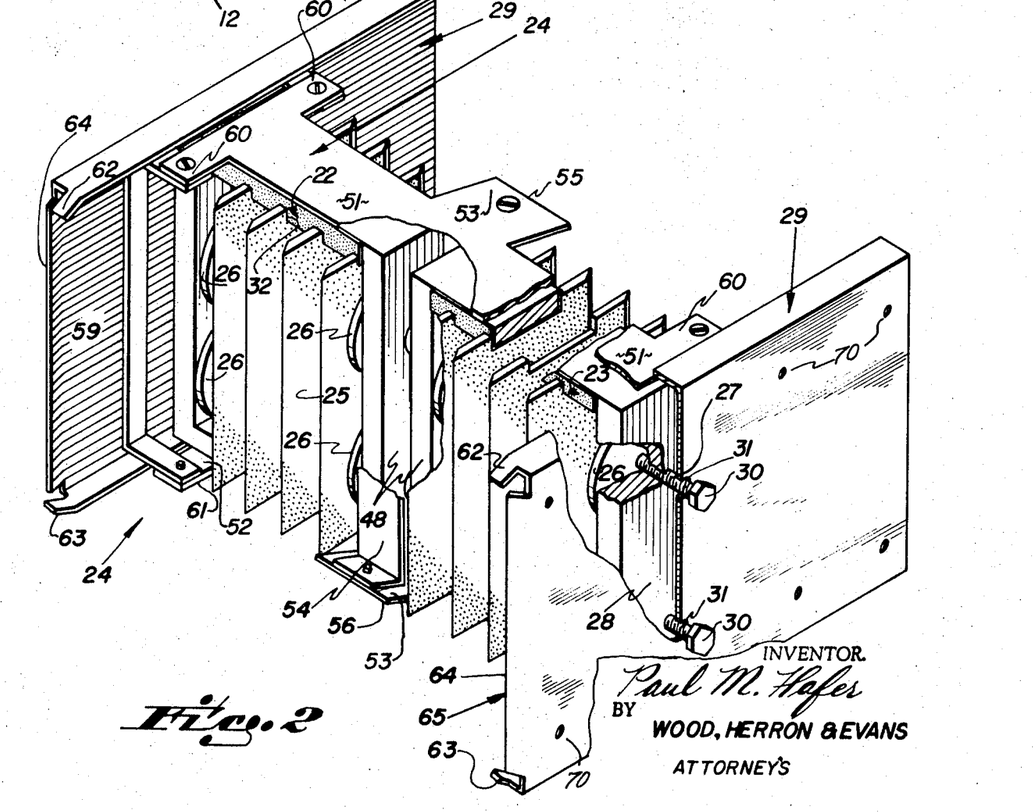
FIG. 2 is a partially broken away, perspective view more particularly illustrating the busbar coupler apparatus.
Figure 3:
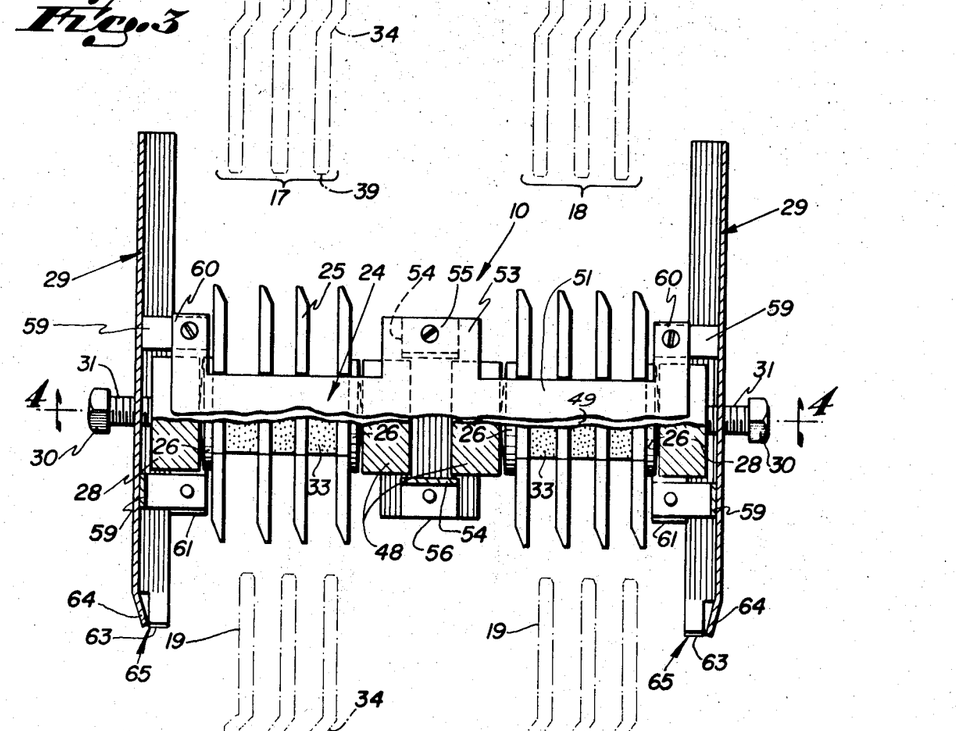
FIG. 3 is a partially broken away, top view of the busbar coupler.

The support frame 24 is established by upper 51 and lower 52 cross bars, each cross bar having tabs 53 integral with the center of the cross bar, see FIGS. 2 and 3. A C-support 54 is mounted between corresponding, inwardly flared ends 55, 56 of the tabs 53 for maintaining alignment of the force frames 22, 23 at the middle of the support frame 24. The sides of the support frame 24 are defined by guide plates or guide channels 29 and the guide plates are each mounted to the upper 51 and lower 52 cross bars by brackets 59 secured between corresponding ends 60, 61 of each cross bar. The guide plates 29 at their leading ends 65 are substantially longer than the axial length of the insulator plates 25 and have inwardly flaring top 62, bottom 63 and side 64 edges. Thus, the support frame 24 includes the upper 51 and lower 52 cross bars, the C-supports 54, and the guide plates 29, all these members being rigidly connected together in a frame relationship. Because of the support frame 24 the force frames 22, 23 are free to move transversely relative to the plane of the insulator plates 25, that is, transversely relative to the axes 35, of the bus ducts 11, 12, yet are maintained in axial position because of the support frame structure.

METHOD OF FORMING JOINTS

FIGS. 5-9 illustrate the unique method of interconnecting a series of successive busbar ducts 11, 12 into a busbar system using the busbar coupler 10 illustrated in FIGS. 1-4. As shown is FIG. 6, each busway section comprises the busbar coupler 10 and the busbar duct 11. These two components can be manufactured individually and separate one from the other thereby providing efficient and economical manufacture of the busway sections. For shipment purposes the coupler 10 is preferably recessed into the housing 16, see FIG. 6, and fasteners such as hex bolts 66 used to hold the guide plates 29 in a fixed position with the housing sides 21 until the busway section is ready for use. Because the leading ends 65 of the guide plates 29 protrude beyond the ends of the busbars when in the shipping position, the ends of the busbars are substantially protected from damage. After reaching the installation site the hex bolts 66 are removed, thereby making the coupler 10 readily movable in the axial direction 35 of the busbar duct 11.

Generally speaking, the busbar coupler 10 is first moved axially in a forward direction into the leading end 41, 44 of the housing 16 to a first or recessed position with the guide plates 29 of the support frame 24 sliding inside of and adjacent to the side walls 21. The entire busbar coupler 10 is received and recessed within the housing 16 except for part of the pressure screws 27 and hex heads 30 that protrude beyond the sides 21 of the housing. It will be noted that the guide plates 29 are about twice the axial length of the spacer plates 25 and this relationship aids in preventing the coupler 10 from becoming "cocked" within the housing 16. The busbar coupler 10 can be moved axially into the housing 16 because of the slots 20 in the side walls 21 that permit the pressure screws 27 to project beyond the side walls as the coupler is recessed into the housing 16, thereby permitting the coupler to be received entirely within the housing.

Once the busbar coupler 10 is recessed within the housing 16, the trailing end 42, 45 of the busbar duct 12 is brought adjacent the leading end 41, 44 of the first busbar duct 11 so that the side walls 21 are mated or abutted together and so that corresponding busbar ends 39 are interleaved, thereby positioning the busbar ducts 11, 12 in end-to-end relation for establishing an electrical joint therebetween. Such a mating of successive busbar ducts 11, 12 lines up the slots 20 in the side walls 21 of the first busbar duct's leading end with the centering indentations 46 in the side walls 21 of the second busbar duct's trailing end 45, see FIGS. 7 and 8. At this point, i.e., with the busbar coupler 10 recessed within the housing 16 of busbar duct 11, the busbar duct 12 can be moved transverse to the axes 35 of the ducts 11, 12 in a plane parallel to the planes of the busbars 19 even though both ducts 11, 12 are positioned in end-to-end relation or abutting relation preparatory to establishing an electrical joint therebetween. Thus, with reference to FIGS. 7 and 8, with busbar coupler 10 at its first position (i.e., recessed within the housing 16 of busbar duct 11), and with the coupler (not shown) of duct 12 recessed into the other end (not shown) of duct 12, duct 12 can be easily and simply dropped out of an extended length busbar run to permit replacement by another similarly constructed duct.

Subsequently, the busbar coupler 10 is moved axially by merely gripping the threaded studs and moving it rearwardly toward the second busbar duct 12 to extend it from housing 16 of duct 11 until the shafts 27 reach the indentations 46. At this second position the insulator plates 25 are positioned intermediate each interleaved pair 67 of busbar ends 39 and each of the two groups 17, 18 of busbars 19 is positioned within its separate "floating" force frame 22, 23 whereby the adjacent interleaved busbar ends of each duct 11, 12 can be clamped together in pairs by the coupler to establish the pressure type electrical joints. The pressure plates, that is, the disc spring washers 26, are then adjusted from outside the housing by the plate positioners, that is the threaded pressure screws 27 and hex heads 30, so that the disc spring washers connect the separate insulator plate-interleaved busbar joints by clamping those joints together into two separate groups of compact, electrically continuous, pressure type joints, see FIGS. 9 and 10. Suitable fasteners, for example, hex bolts 69, are then used to hold the guide plates 29, that is, the busbar coupler's support frame, in a fixed and immobile position relative to the sides 21 of the ducts 11, 12 by engaging the bolts 69 with suitable mated threaded holes 70 in the guide plates and duct sides. Covers, not shown, may be placed over the top and/or bottom of the final joints if desired, to form a continuous outer covering for the busbars. The channel type covers, not shown, span the opening left between the leading 41 and trailing 42 ends of successive housing tops 36 and bottoms 37, and are retained in place by suitable fasteners, not shown, cooperating with holes 68 in the housings 16.

Because the threaded shafts 27 are only threadedly engaged with the outer ends 28 of force frames 22, 23 and are not threadedly engaged with either the guide channels 29 or the side walls 21 of the housing 16, no part of the structure other than the force frames 22, 23 is subjected to stress and strain when excess heat in the system causes expansion and/or contraction of the busbars. That is, the two groups of the busbar joints are isolated from the housing 16 and from each other. The pressure type electrical joints are made only by the force frames 22, 23 in combination and cooperation with the insulator plates 25, the pressure plates 26, and the positioning shafts 27, the corresponding busbar ends 39 being clamped together within the force frames. Thus, the busbar joints "float" within the housing 16.

The assembly method described above permits simple and easy original installation of a busbar system. Further, a single busway section may be easily replaced merely by (a) loosening the pressure plates, that is, the disc spring washers 26, from outside the housing 16 at each end of the busbar duct to be removed to disconnect the pressure type electrical joints, (b) removing the hex bolts 69 to disengage the guide plates 29 from the side walls 21, (c) axially recessing or telescoping the couplers 10 at each end into their respective housings 16, and (d) dropping the section to be replaced out of the extended length busbar run. No adjacent busbar ducts need be removed.

ALTERNATIVE EMBODIMENT

Figure 11:
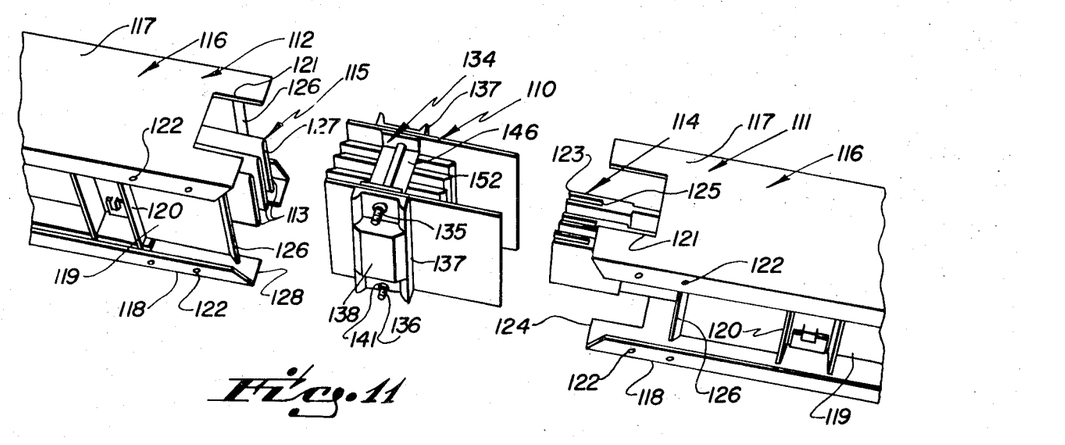
FIG. 11 is a view similar to FIG. 1 illustrating an alternative embodiment of the busbar coupler.

An alternative embodiment of the busbar coupler system of this invention is illustrated in FIGS. 11–20. As is illustrated in FIG. 11, the busbar coupler 110 of this alternative embodiment is adapted for use in combination with a first 111 and a second 112 busbar duct of that type having a single group of, for example, three busbars 113, positioned therein. The ducts 111, 112 particularly useful with this alternative embodiment of the busbar coupler system is particularly described in my co-pending application U.S. Serial No. 695,982. At one end of each busbar duct 111, 112 the busbar ends are provided in bifurcated or fork like configuration 114 and at the other end the busbar ends are provided in stab form 115 so that the stab ends 115 of a second busbar duct 112 can be received or interleaved with fork ends 114 of a first busbar duct 111 when those two busbar ducts 111, 112 are brought together in end-to-end or abutting relation for purposes of creating an electrical joint therebetween, see FIGS. 14 and 17. Thus, an extended length busbar run can be created of successive busway sections by mating the ends 114, 115 of successive busbar ducts.

The type of busbar duct 111, 112 provided to cooperate with the busbar coupler 110 of this alternative embodiment is comprised of a housing 116 having top 117 and bottom 118 channel shaped members and sides 119. The sides 119 are provided with reinforcing members 120. The ends of the housing's top 117 and bottom 118 have notches 121 cut therein for permitting the mated or interleaved busbar ends 114, 115 to be observed when the busbar ducts 111, 112 and the duct housings are adjoined in end-to-end or abutting relation, see FIG. 17.

Tapped holes 122 are provided adjacent the periphery of the notches so that channel like covers, not shown, can be attached between the successive busbar ducts to close the openings created by the notches after the pressure type electrical joint has been created by the coupler 110. By removing the channel like covers, not shown, the joint is easily made visible so it can be observed for maintenance purposes.

Figure 15:
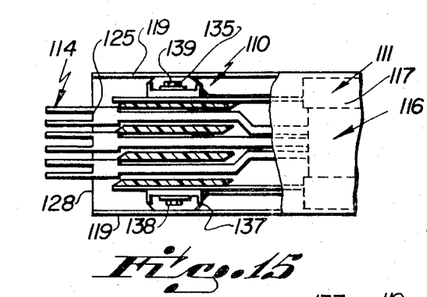
FIG. 15 is a view of the alternative embodiment similar to FIG. 5.

The sides 119 of each busbar duct 111, 112 adjacent that end having the bifurcated or fork ends 114 are recessed substantially behind the outermost tips 123 of the busbars' fork ends and substantially behind the leading edge 124 of the housing's top 117 and bottom 118, the leading edge 124 being in the same vertical plane as the base 125 of the fork ends, see FIGS. 11 and 15. Also, the sides 119 are provided with an outwardly flared leading edge 126 and aids in admitting the busbar coupler 110 as it is recessed within the housing, see FIG. 11. The sides 119 of each busbar duct housing 116 adjacent that end having the stab ends 115 are recessed just slightly beyond the tips 127 of the stab ends 115, and the trailing edges 128 of the housing's top 117 and bottom 118 are in the same vertical plane as the tips 127 of the stab ends 115. Hence, as the first busbar duct 111 is advanced toward the second busbar duct 112, the first duct's fork ends 114 engage the second duct's stab ends 115 to establish an interleaved relation one with the other and are advanced one toward the other until the first duct's housing leading edges 124 abut the second duct's housing trailing edges 128 to completely seat or interleave the stab ends 115 in the fork ends 114, see FIG. 17. Thus, the busbar ducts 111, 112 are established in end-to-end relation for creating the electrical joint when fork ends 114 and stab ends 115 of successive busway sections are interleaved, that is, when first duct's housing leading edge 124 abuts second duct's housing trailing edge 128.

The notches 121 at the ends of the housing's top 117 and bottom 118 are dimensioned to permit the fork ends 114 to drop therethrough when the fork ends of one busbar duct are interleaved with the stab ends 115 of an abutting busbar duct, as will be subsequently explained in further detail.

Figure 12:
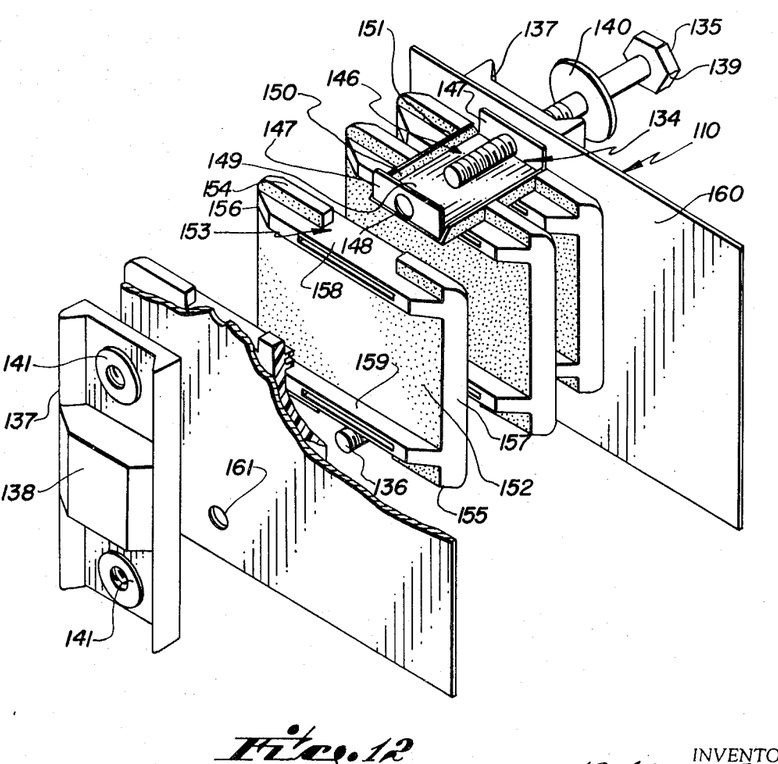
FIG. 12 is a view of the alternative embodiment similar to FIG. 2 but illustrates the busbar coupler in exploded fashion.
Figure 13:
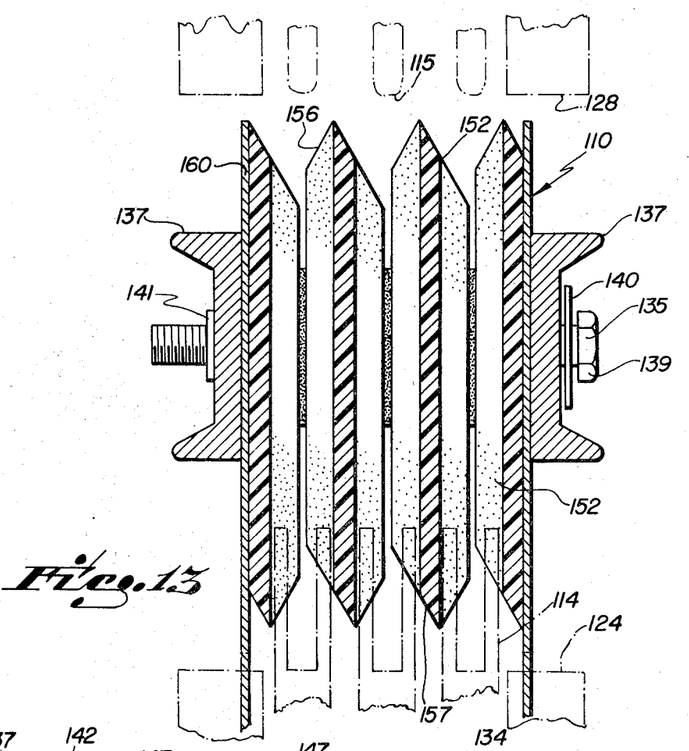
FIG. 13 is a view of the alternative embodiment similar to FIG. 3.
Figure 14:
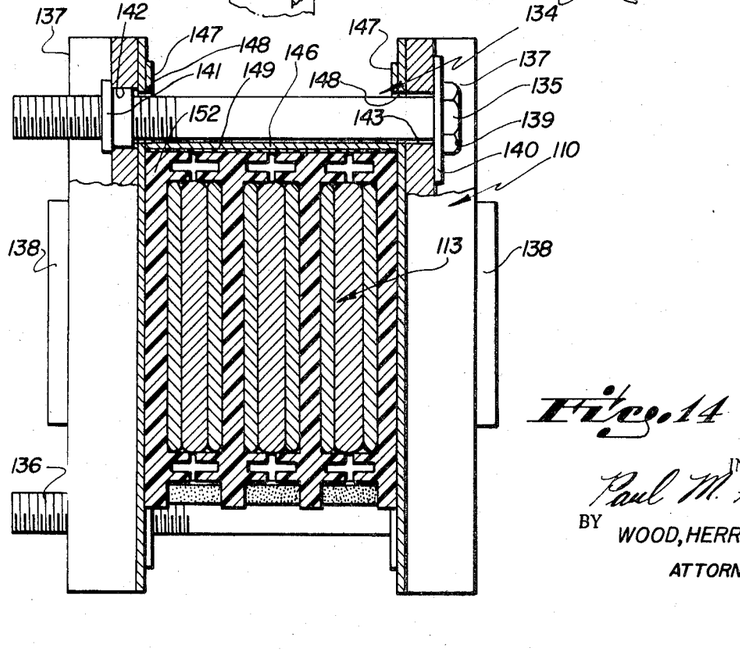
FIG. 14 is a view of the alternative embodiment similar to FIG. 4.

The busbar coupler 110 of this alternative embodiment is particularly illustrated in FIGS. 12–14. The coupler 110 includes a force frame 134 for permitting pressure to be exerted on the pairs of interleaved busbar ends to create the electrical joint between busway sections. The force frame 134 is comprised of a top bolt 135, a bottom bolt 136, and pressure members in the form of rigid, heavy duty channels 137 reinforced at their middle by blocks 138. The bolts 135, 136 interconnect the pressure members 137 to form the force frame 134 and each is provided at one end with a hex head 139 and a spring disc washer 140, the bolts passing through holes 143 in the right hand pressure member 137 without being threadedly engaged thereto on that side of the frame where the hex head is positioned, see FIG. 14. The hex heads 139 facilitate turning of the bolts 135, 136 by a suitable wrench to vary the dimensions of and, hence, the pressure exerted by, the force frame 134 relative to the interleaved busbar end pairs of corresponding busbars.

The opposite or left hand pressure member 137 of the force frame is provided with two internally threaded T-collars 141 which are fixed within holes 142 provided in that left hand pressure member, the bolts being threadedly engaged with the T-collars, see FIG. 14. The bolts 135, 136 are positioned one above the other a sufficient distance to permit the stab ends 115 and the fork ends 114 of corresponding busbars 113 from successive busbar ducts to pass therebetween and interleave, thereby allowing the force frame 134 to surround the interleaved busbars 113 and form an electrical joint. The combination of the threads on the bolts 135, 136 and the threaded collars 141 fixed in one of the pressure members 137 provides pressure means adjustably associated with the force frame 134 for varying the pressure exerted by the force frame on the interleaved pairs 114, 115 of corresponding busbar ends to permit selective connecting and disconnecting of the pressure type electrical joint formed by abutting or end-to-end busway sections. That is, by engaging the hex heads 139 with a wrench and rotating the bolts 135, 136 in one direction the pressure members 137 are forced apart from one another to disconnect the pressure type electrical joint so that the second busbar duct's stab ends 115 can be removed from interleaved position with the first busbar duct's fork ends 114. By rotating the bolts 135, 136 in the other direction the pressure members 137 are forced toward one another to clamp and to connect the interleaved busbar end pairs 114, 115 into the pressure type electrical joint.

Each of the top 135 and bottom 136 bolts carry a positioning rack 146 having upstanding ends 147. The ends 147 are provided with aligned holes 148 through which a bolt 135, 136 passes in a nonengaging relation, see FIGS. 12 and 14. The bottom 149 and side edges 150 of each positioning rack 146 are covered with an insulator sheet 151 to provide complete electrical insulation for the busbars 113 from the top 135 and bottom 136 bolts when the coupler 110 is in electrical joint forming relation with the interleaved ends 114, 115 of successive busbar ducts 111, 112.

Figure 16:
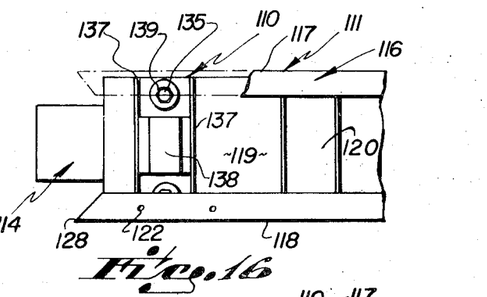
FIG. 16 is a view of the alternative embodiment similar to FIG. 6.
Figure 17:
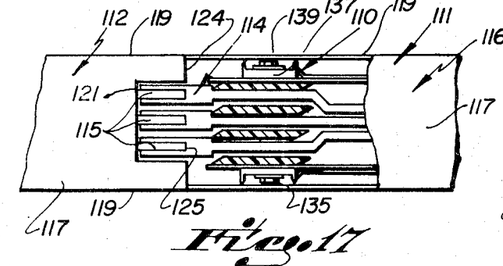
FIG. 17 is a view of the alternative embodiment similar to FIG. 7.
Figure 18:
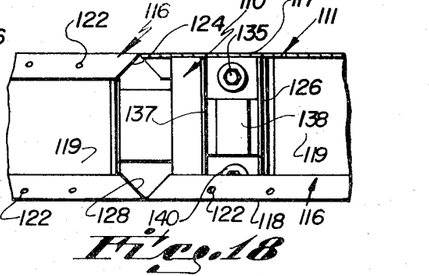
FIG. 18 is a view of the alternative embodiment similar to FIG. 8.

The force frame 134, as defined by the pressure members 137 and the bolts 135, 136, is also provided with spacer plates 152 that are made of an insulating material. The spacer plates 152 are provided with notches 153 in both the top 154 and bottom 155 edges that are sized to fit the positioning racks 146 carried by the bolts 135, 136 of the force frame 134. The width of the spacer plates 152 between the bottoms of the notches 153 is substantially equal to the distance between the bottoms 149 of the two positioning racks 146 so that the spacer plates cannot move axially relative to the axis of a busbar duct when the coupler is in operating position as shown in FIGS. 15–17, but enough play is provided so that the plate 152 can move transverse to that axis. The spacer plates 152 are provided with pointed leading 156 and trailing 157 edges and this edge configuration of the spacer plates, in combination with their ability to slide between the two side pressure members 137 on the positioning racks 146, aids in spacing the spacer plates between interleaved end pairs 114, 115 of corresponding busbars when the coupler 110 is used in accordance with the method of assembly of this invention. Further, each spacer plate 152 is provided with an upper 158 and a lower 159 flange positioned apart one from the other a distance substantially equal to the width of the busbars 113, such flanges also aiding in centering the corresponding busbar ends in interleaved relation one with the other preparatory to tightening the bolts 135, 136 and forming the pressure type electrical joint therebetween, see FIG. 14.

The coupler 110 further includes a guide plate 160 positioned between the outermost spacer plate 152 and the pressure member 137 on each side of the coupler, the bolts 135, 136 of the force frame 134 passing through holes 161 to hold the guide plates in position relative to the force frame. The holes 161 in the guide plates 160 through which the bolts 135, 136 pass are larger than the bolt diameter so that the bolt is not threadedly engaged with the guide plates but is permitted to rotate axially relative thereto. It will be noted that the guide plates 160 extend to a point substantially flush with the leading edge 156 of the spacer plates 152 on one side, see FIGS. 11 and 13. However, on the other side the guide plates 160 extend a distance substantially beyond the trailing edges 157 of the spacer plates 152.

In operation of the alternative embodiment of the busbar coupler 110 with the busbar ducts 111, 112, as illustrated in FIGS. 15-20, the busbar coupler is initially recessed or telescoped into the housing 116 of the first duct 111 to a first position which permits transverse movement of the successive or second busbar duct 112 when both busbar ducts are positioned in end-to-end relation for establishing an electrical joint therebetween. Since busbar coupler 110 is symmetrically constructed, the coupler may be rotated 180° on the longitudinal axis of the busbar duct housing 116 so that the hex heads 139 of bolts 135, 136 may be located on the housing side preferred without complete or partial dismantling of the coupler. Note particularly in FIGS. 17 and 18 when the busbar coupler 110 of this alternative embodiment is recessed into the first busbar duct's housing 116 that the guide plates 160, spacer plates 152, and force frame 134 are all recessed into the housing to a point which permits the abutting or successive busbar duct 112 to be dropped out of interleaved engagement with the *fork* ends 114 of the first busbar duct without engaging or contacting the busbar coupler 110 as it drops out. Hence, the second busbar duct 112 is permitted to move transverse to the first busbar duct 111 when the busbar coupler is recessed into the first busbar duct's housing to that first position when both busbar ducts are positioned in an end-to-end relation for establishing an electrical joint therebetween.

Figure 19:
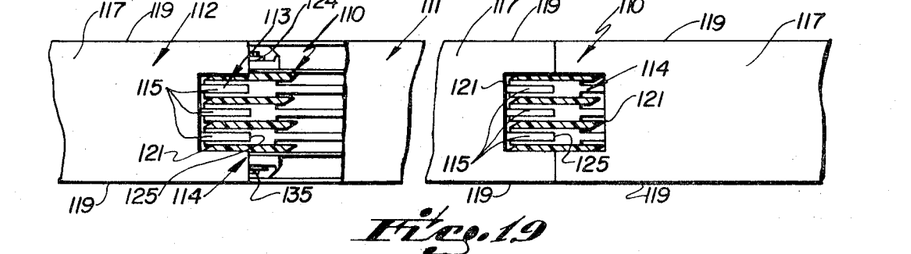
FIG. 19 is a view of the alternative embodiment similar to FIG. 9.
Figure 20:
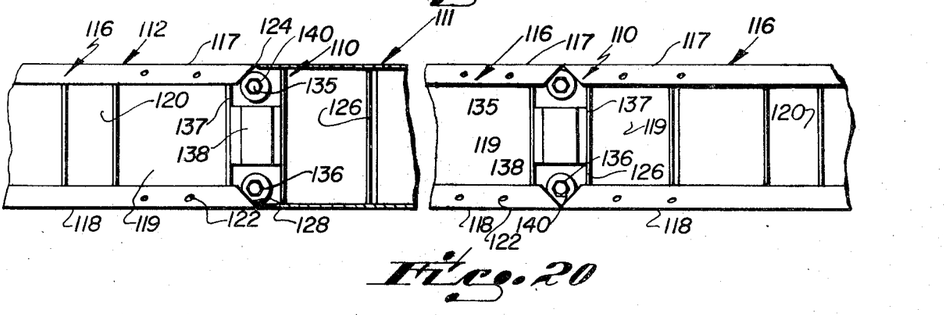
FIG. 20 is a view of the alternative embodiment similar to FIG. 10.

After the busbar coupler 110 has been telescoped into the first busbar duct's housing 116 to that first position, and after the second busbar duct 112 has been positioned in end-to-end relation with the first busbar duct whereat the stab ends 115 of the second busbar duct are interleaved with the *fork ends* 114 of the first busbar duct, the busbar coupler 110 is extended or telescoped out of the first busbar duct's housing toward the second busbar duct's housing to a second position whereat the coupler can clamp the adjacent interleaved busbar ends 114, 115 together in pairs to establish the pressure type electrical joint, see FIG. 19. When the interleaved busbar pairs 114, 115 are surrounded by the force frame 134 at this second position, see FIGS. 14 and 19, the bolts 135, 136 of the frame 134 need merely be tightened with a suitable wrench to connect or clamp the interleaved busbar pairs into the pressure type electrical joint, those joints being separated one from the other by the spacer plates 152 and no single busbar joint being directly exposed to the other because of the presence of the top 158 and bottom 159 flanges of adjacent spacer plates in combination with the insulating sheet 151 carried on the bottom of the positioning racks 146. When the busbar coupler 110 is in its second or extended position the guide plates 160 of the coupler cooperate with the side walls 119 of the two busbar duct housings 116 to provide a continuous side wall from one housing to the other with no interruption or gap which would expose the busbars themselves to the environment. Once the bolts 135, 136 of the force frame 134 have been tightened to establish the pressure type electrical joint, the covers, not shown, can be fastened onto the top 117 and bottom 118 of the two busbar duct housings 116 by means of tapped holes 122 and bolts, not shown, to close the openings created by notches 121 when the ducts 111, 112 are butted and, thereby, provide a completely enclosed chamber or housing for the busbar joint. Thus, the method steps of operation of the alternative embodiment busbar coupler 110 are substantially the same as those of the busbar coupler 24 embodiment described previously, and the advantages attendant to the busbar coupler of this invention are also present in this alternative embodiment of the busbar coupler structure.

What I desire to claim and protect by Letters Patent is:

1. A busway section comprising
   a busbar duct having a housing and at least two busbars positioned in said housing, and
   a busbar coupler axially movable relative to said housing between a first position whereat said coupler is recessed within said housing to a point which permits transverse movement of a successive busway section relative to said busway section when both sections are positioned in end-to-end relation for establishing an electrical joint therebetween and a second position whereat said coupler is extended from said housing to a point which permits the adjacent, corresponding busbar ends of each section to be clamped together in pairs by said coupler to establish the electrical joint.

2. Apparatus as set forth in claim 1 wherein said busbar coupler includes
   a force frame for permitting pressure to be exerted on the pairs of adjacent, corresponding busbar ends to create the electrical joint between sections, and
   pressure means adjustably associated with said force frame for varying the pressure exterted to permit seletcive connecting and disconnecting of the electrical joint.

3. Apparatus as set forth in claim 2 wherein said force frame substantially surrounds said busbars, and wherein said busbar coupler further includes
   at least one insulator plate retained within said force frame for inulsating said busbar end pairs one from the other.

4. Apparatus as set forth in claim 3 wherein said force frame is rectangularly shaped an completed surrounds said busbars, and wherein said insulator plate is adjustably positionable in a direction substantially transverse to the direction of said coupler's axial movement.

5. Apparatus as set forth in claim 3 wherein said busbar coupler includes
   a guide plate associated with each end of said force frame for cooperating with the sides of said busbar duct's housing.

6. Apparatus as set forth in claim 4 having at least two insulator plates wherein said pressure means includes
   a pressure plate adjustably mounted to said force frame and adapted to bear against one of said insulator plates, and
   a plate positioner connected to said pressure plate for adjustably positioning said insulator plates within said force frame to permit clamping together of said busbar end pairs.

7. Apparatus as set forth in claim 6 wherein said pressure plate comprises a disc spring washer and said plate positioner comprises a pressure screw threadedly engaged with one side of said force frame.

8. Apparatus as set forth in claim 6 wherein said busbar duct includes
   structure defining a slot in one side of said housing that commences at one end of said side, said plate positioner traversing said slot as said coupler moves between said first and second position.

9. Apparatus as set forth in claim 3 wherein said busbar coupler includes
   a support frame surrounding said force frame, said support frame being configured to permit movement of said force frame relative to said support frame in a direction substantially transverse to the direction of said coupler's axial movement and configured to prevent substantial movement of said force frame relative to said support frame in the same direction as said coupler's axial movement.

10. Apparatus as set forth in claim 4 wherein said busbar duct comprises at least two groups of busbars, and wherein said busbar coupler comprises at least two force frames, one force frame substantially surrounding each busbar group.

11. Apparatus as set forth in claim 10 wherein said force frames are disposed in substantially the same plane, that plane being positioned transversely across said busbar duct.

12. Apparatus as set forth in claim 11 wherein each of said force frames includes a plurality of insulator plates retained within said force frame, said plates being adjustably positionable in a direction substantially transverse to the direction of said coupler's axial movement, a pressure plate adjustably mounted to the outer end of said force frame and adapted to bear against an adjacent insulator plate, and a plate positioner connected to said pressure plate for adjustably positioning said insulator plates within said force frame to permit clamping together of said busbar end pairs.

13. Apparatus as set forth in claim 12 wherein said busbar coupler includes a support frame surrounding said force frames, said support frame being configured to permit transverse movement of said force frames relative to the axial movement of said coupler and being configured to prevent substantial movement of said force frames in the same direction as the coupler's axial movement.

14. Apparatus as set forth in claim 13 wherein said support frame includes a guide plate mounted to each side of said support frame for cooperating with the side of said busbar duct's housing.

15. Apparatus as set forth in claim 4 wherein said force frame and said pressure means include a pair of pressure members positioned opposite one to the other, and a pair of bolts interconnected between said pressure members to form a frame configuration, each of said bolts being threadedly engaged with one of said pressure members.

16. Apparatus as set forth in claim 15 including a guide plate associated with each end of said force frame for cooperating with the sides of said busbar ducts' housing.

17. A method of electrically connecting and disconnecting a first and a second busbar duct in succession, each of said ducts having at least two busbars and a housing surrounding said busbars, comprising the steps of providing a busbar coupler having at least one force frame surrounding said busbars and a group of insulator plates retained within said force frame that are positionable between said busbars, moving said busbar coupler axially in a forward direction into the leading end of said first busbar duct's housing until said busbar coupler is recessed within the housing to a first position which permits transverse movement of said second busbar duct relative to said first busbar duct when both ducts are positioned in end-to-end relation for establishing an electrical joint therebetween, an insulator plate being positioned on each side of each busbar, mating said second busbar duct with said first busbar duct in end-to-end relation for establishing an electrical joint therebetween, moving the busbar coupler axially in a reverse direction to a second position whereat said busbar coupler is extended from said first busbar duct's housing to a point which permits the adjacent, corresponding busbar ends of each duct to be clamped together in pairs by said coupler, and clamping the adjacent busbar end-insulator plate joint into an electrically continuous interconnection.

18. A method as set forth in claim 17 wherein said busbar coupler is additionally provided with pressure means adjustably associated with said force frame and wherein said clamping step comprises varying the pressure exerted on the busbar end-insulator plate joint by adjusting said pressure means to permit selective connecting and disconnecting of said joint.

19. A method as set forth in claim 18 wherein said pressure means is adjusted from outside said busbar ducts' housings without removing any of said housings.

References Cited

UNITED STATES PATENTS

| | | | |
|---|---|---|---|
| 3,004,097 | 10/1961 | Johnston et al. | 339—22X |
| 3,021,499 | 2/1962 | Rascati | 339—22 |

FOREIGN PATENTS

| | | | |
|---|---|---|---|
| 1,169,034 | 9/1958 | France | 339—273 |

RICHARD E. MOORE, Primary Examiner

U.S. Cl. X.R.

339—174

PO-1050
(5/69)

UNITED STATES PATENT OFFICE
CERTIFICATE OF CORRECTION

Patent No. 3,559,148          Dated January 26, 1971

Inventor(s) Paul M. Hafer

It is certified that error appears in the above-identified patent and that said Letters Patent are hereby corrected as shown below:

Column 1, Line 16 delete the word [dust] and insert the word duct.

Column 1, Lines 66-67 delete the word [correspond] and insert the word corresponding.

Column 11, Line 41 insert the word force before the word "frame".

Claim 4, Column 12, Line 26 after the word "shaped" delete [an completed] and insert the words and completely Signed and sealed this 8th day of June 1971.

(SEAL)
Attest:

EDWARD M. FLETCHER, JR.          WILLIAM E. SCHUYLER, JR.
Attesting Officer          Commissioner of Patents